United States Patent [19]
Brimmer et al.

[11] 4,237,748
[45] Dec. 9, 1980

[54] REVERSING HYDROMECHANICAL TRANSMISSION

[76] Inventors: Alexandr A. Brimmer, Sadovo-Chernogryazskaya ulitsa, 13/3, kv. 93; Semen I. Berezov, Perovskaya ulitsa, 13, korpus 2, kv. 104; Jury B. Deinego, ulitsa Druzhby, 2/19, kv. 199, all of Moscow; Vladimir Y. Demidov, Studenchesky proezd, 6, kv. 94, Ivanteevka Moskovskoi oblasti; Leonid K. Voinich, ulitsa Ivovaya, 5, kv. 14, Moscow, all of U.S.S.R.; Lorell White, 5747 S. Honore, Chicago, Ill. 60636

[21] Appl. No.: 883,257
[22] Filed: Mar. 3, 1978
[51] Int. Cl.³ .............................. F16H 47/00
[52] U.S. Cl. ........................................ 74/732
[58] Field of Search .................. 74/730, 731, 732; 192/4, 4 B

[56] References Cited

U.S. PATENT DOCUMENTS

| | | | |
|---|---|---|---|
| 3,159,054 | 12/1964 | Gros | 74/732 |
| 3,814,221 | 6/1974 | Fuehrer | 74/732 X |
| 4,050,556 | 9/1977 | Forster | 192/4 B |

*Primary Examiner*—C. J. Husar
*Assistant Examiner*—Frank McKenzie
*Attorney, Agent, or Firm*—Haseltine, Lake & Waters; Gary, Juettner & Pyle

[57] ABSTRACT

A reversing hydromechanical transmission designed for transmitting power from the engine to the power consumer, i.e. the driven mechanism, of road building machines. The transmission comprises a reversing gear with at least two controlled clutches, a gearbox and a hydrodynamic drive, said units being kinematically interconnected. The input shaft of the reversing gear is connected to the engine shaft. At least one output shaft of the reversing gear is connected through the gearbox to at least one shaft of the hydrodynamic drive. The shaft of the turbine incorporated in the hydrodynamic drive is connected to the power consumer. The transmission constituting the present invention provides for smooth reversal of the power consumer, reduced energy expenditure in the traction and reverse modes of operation, efficient operation as a hydraulic retarder, and limiting the output torque in order to prevent slippage of the power consumer and to reduce dynamic loads.

6 Claims, 11 Drawing Figures

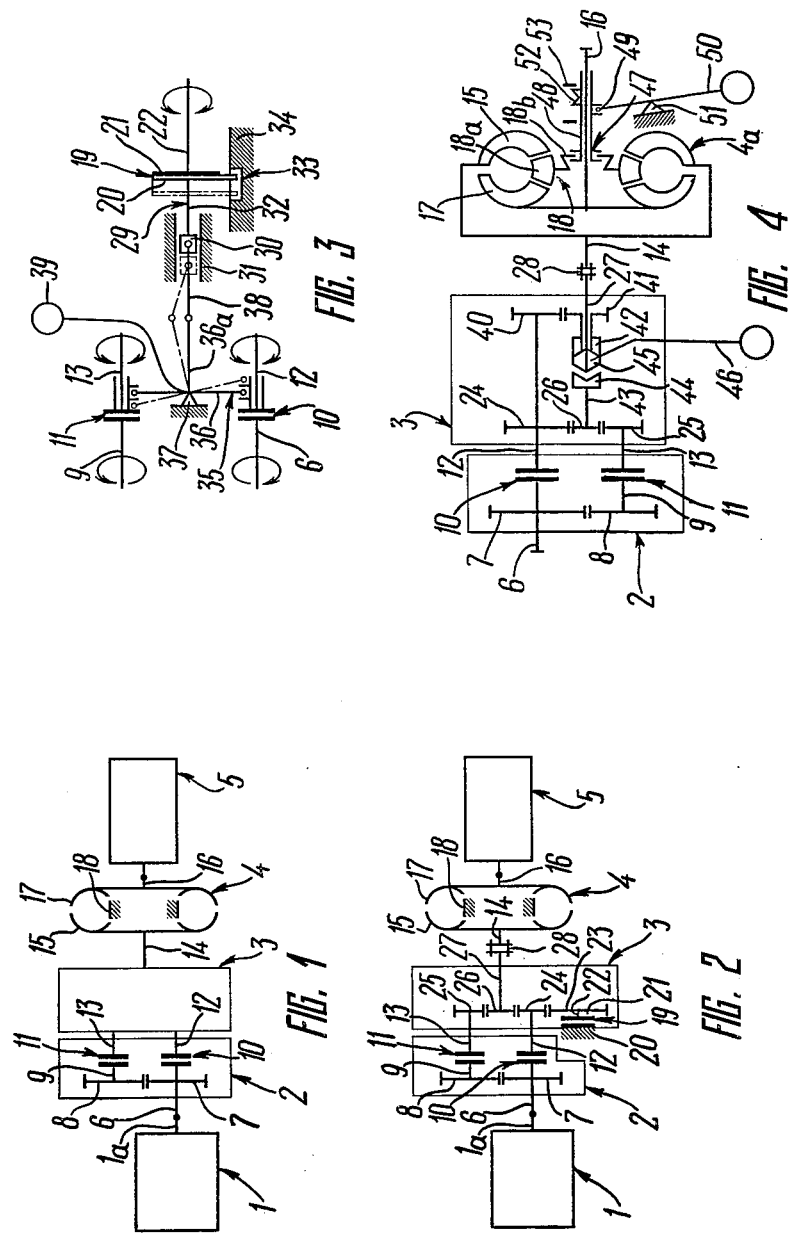

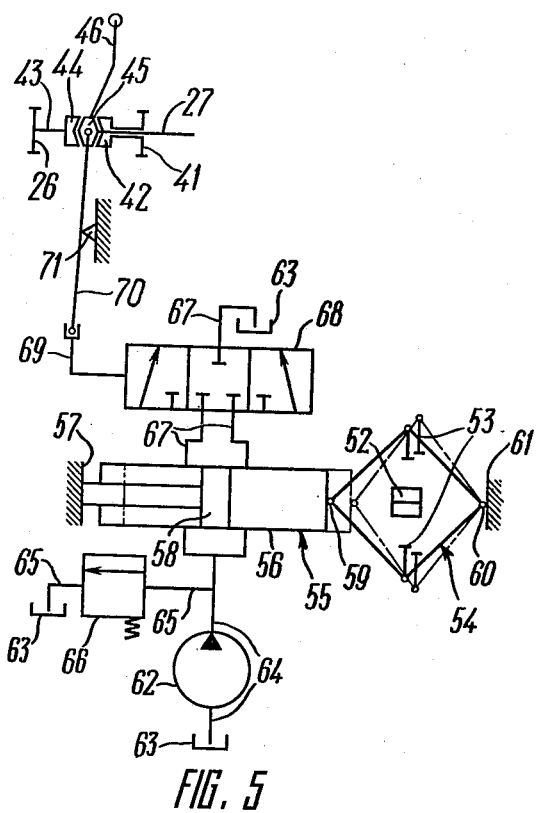
FIG. 5
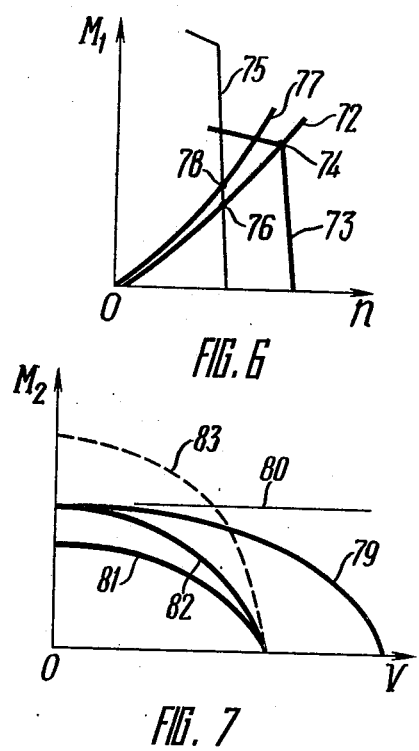
FIG. 6
FIG. 7

REVERSING HYDROMECHANICAL TRANSMISSION

The present invention relates to devices for transmitting power from the source of energy to the power consumer and has particular reference to a reversing hydromechanical transmission.

The reversing hydromechanical transmission constituting the present invention can be used with particular advantage for transmitting power from the engine to the power consumer in road building machines operating on the shuttle principle of the driven mechanism, viz. rolls and wheels of self-propelled road rollers, slewing superstructures of excavators and cranes, and hoisting winches.

The present invention can also be used in various fields of engineering for transmitting power from the engine to the driven mechanism which, during operation thereof, make a reciprocating or a to-and-fro rotary movement, for example, mining planers and combines or agricultural and forestry machines.

Widely known in the art is a reversing hydromechanical transmission having a hydrodynamic drive comprising an impeller and a runner. The impeller shaft is connected to the engine shaft, whereas the runner shaft is connected to the input shaft of a reversing gear. The connection between the impeller and the runner is effected through the medium of a working fluid circulating between the vanes of said impeller and runner. This form of a hydrodynamic drive is essentially a fluid coupling.

Another embodiment of the reversing hydromechanical transmission known in the art has a hydrodynamic drive comprising a stationary reaction member, referred to hereinafter as a stator, which is installed between an impeller and a turbine and serves the purpose of effecting conversion of the output torque. This form of a hydrodynamic drive is essentially a hydraulic torque converter.

The input shaft of the reversing gear is kinematically connected with two output shafts, the kinematic connection being effected by means of two controlled clutches and a gearing having an even number of gears. Due to this constructional arrangement, when one of the clutches is engaged, the allied output shaft of the reversing gear transmits power from the engine shaft in the same direction of rotation, whilst the engagement of the other clutch provides for transmission of power from the engine shaft in the opposite direction of rotation.

The output shafts of the reversing gear have a rigid mechanical connection with the power consumer through the medium of a gearbox.

Said gearbox has one or several speeds with a gearchange mechanism operated by means of a gearchange lever. Therefore, the power consumer can receive power from the engine shaft not only in different directions of rotation, but also through various gear ratios. One embodiment of said reversing hydromechanical transmission comprises a gearbox wherein use is made of a brake coupling with a device for the control thereof, which brake coupling is connected to the gearbox output shaft, the latter being connected to the power consumer for the purpose of braking the same through the operation of the brake coupling.

In another embodiment the gearbox has several speeds and the gearbox output shaft is also connected to the power consumer.

In some forms of said embodiment the hydrodynamic drive has a power regulating device whose control is provided with a limiter of the travel thereof.

More particularly, in an embodiment of the hydrodynamic drive use is made of a stator with variable-pitch vanes, the control of the drive being made in the form of a lever the travel of which is limited by limiter stops.

In another embodiment of the reversing hydromechanical transmission the gearbox thereof has another output shaft kinematically connected with the gearbox output shaft through a gearing having an odd number of gears and a sliding clutch with a device for control thereof, said other output shaft also being connected to the power consumer.

In still another embodiment of the reversing hydromechanical transmission the gearbox output shaft is kinematically connected to the gearbox input shaft by means of an engaging clutch with a device for control thereof. The gearbox has another output shaft kinematically connected to the gearbox input shaft by means of another engaging clutch with a device for control thereof, both output shafts being connected to power consumers.

The reversing hydromechanical transmission in question suffers mainly from the disadvantage that it does not provide for smooth reversal of the power consumer insasmuch as the kinematic connection by means of the gearbox between the output shafts of the reversing gear and the power consumer is rather rigid because of the use of shafts interconnected by means of gearing, said disadvantage being aggravated by the fact that such transmissions usually employ friction clutches operating by virtue of friction forces which practically defy regulation. The smoothness of reversing the power consumer is fully determined by the smoothness of shifting the reversing gear clutch, the latter condition being very difficult to attain.

A further disadvantage of said reversing hydromechanical transmission is that the efficiency of its operation is low in the event of energy being transmitted from the power consumer to the engine, i.e. in the reverse direction. This operating condition (which will be referred to hereinafter as a reverse mode of operation) occurs, for example, in a road roller on a downgrade or a hoisting winch lowering the load.

When the reversing hydromechanical transmission known in the art operates in the reverse mode, energy is transmitted from the power consumer to the engine, causing the latter to work as a brake with attendant increase in engine wear, exhaust pollution of the atmosphere, operating noise, and other unwanted phenomena.

A still further disadvantage of said reversing hydromechanical transmission, particularly when used for driving a road roller and arranged so that a gearbox having several speeds is positioned after the hydrodynamic drive and the reversing gear, is that in lower gears, i.e. in high gearbox ratios, it does not provide for limiting the maximum torque transmitted to the power consumer with the result that slippage of the road roller driving rolls or wheels may be caused by shifting the clutches of the reversing gear, i.e. during the process of reversal, the quality of the road rolling job being adversely affected.

The aforesaid disadvantage is attributed to the fact that the hydrodynamic drive, in virtue of the direct connection between the impeller shaft and the engine shaft, constantly takes off power from the engine.

The power received from the engine is transmitted through the reversing gear to the gearbox and thence to the power consumer, the gear ratios of the reversing hydromechanical transmission being changed by effecting gear changes in the gearbox.

The aforesaid change of gear ratios causes variation of the rotational speed of the power consumer and, in virtue of constant power takeoff, at the same time causes variation of torque. In order to obtain slow speeds of the power consumer, substantially high gearbox ratios are selected, due to which the torque transmitted to the power consumer may exceed the maximum permissible values appropriate to the normal adhesion of the road roller rolls or wheels to the road surface.

A still further disadvantage of said reversing hydromechanical transmission, particularly when used for driving a hoisting winch, is that it takes considerable energy from the engine for effecting forced reversal of the power consumer.

Said forced reversal is characterized in that, in order to cause the power consumer to move in reverse, the clutches of the reversing gear are shifted during forward movement of the consumer in such a manner that the forward drive clutch is disengaged and the reverse drive clutch is engaged or, conversely, during reverse movement of the consumer the reverse drive clutch is disengaged and the forward drive clutch is engaged, the clutches being thus switched over during the movement of the consumer in the opposite direction. The energy taken by the reversing hydromechanical transmission from the engine in order to effect the reversal of the power consumer is essentially equal to the sum of the quantities of the braking and accelerating kinetic energy of the power consumer, the braking energy being possibly two to four times as great as the accelerating energy.

It is the primary object of the present invention to provide a reversing hydromechanical transmission intended for use in road building machines and comprising a reversing gear, a gearbox and a hydrodynamic drive interconnected for transmitting power from the engine to the power consumer in such a manner as to improve the smoothness of the reversal of the power consumer.

It is a further object of the present invention to provide a hydromechanical transmission capable of efficient operation in the reverse mode and having a rather compact construction with the minimum of units.

It is a still further object of the present invention to provide a reversing hydromechanical transmission capable of limiting the maximum torque transmitted to the power consumer during low-speed movement thereof.

It is a still further object of the present invention to provide a reversing hydromechanical transmission capable of reducing energy expended in the process of effecting reversal of the power consumer.

It is a still further object of the present invention to provide a reversing hydromechanical transmission capable of reducing energy expended for the movement of the power consumer under steady operating conditions.

These and other objects are achieved in a reversing hydromechanical transmission comprising a reversing gear with at least two controlled clutches, a gearbox and a hydrodynamic drive kinematically interconnected for the purpose of transmitting power from the engine to the power consumer, wherein, according to the invention, the input shaft of the reversing gear is connected to the engine shaft, whereas at least one output shaft of the reversing gear is connected through the gearbox to at least one shaft of the hydrodynamic drive the turbine shaft of which is connected to the power consumer.

With the transmission units connected in this manner, the hydrodynamic drive is situated after the reversing gear, which makes it possible to smooth out dynamic surges of torque arising in shifting the reversing gear clutches and to prevent their transmission to the power consumer, whereby a substantially high smoothness of power consumer reversal is attained.

It is desirable that the reversing hydromechanical transmission should comprise a gearbox having a brake coupling with a device for control thereof, the output shaft of said gearbox being connected to the shaft of the impeller incorporated in the hydrodynamic drive and a kinematic connection being provided between said output shaft of the gearbox and said brake coupling, the latter being situated in parallel with the shafts of the impeller and turbine, said device for control of the brake coupling being interlocked with the device for control of the reversing gear clutches in such a manner that when the brake coupling is engaged the reversing gear clutches are out of engagement with the result that the hydromechanical transmission works as a hydraulic retarder.

With this constructional arrangement of the hydromechanical transmission, the reverse mode of operation wherein energy is delivered from the power consumer is effected by engaging the brake coupling. Under these conditions the impeller shaft stops, whereas the power consumer, which is rigidly coupled to the turbine shaft, moves against the forces of fluid resistance arising due to the fact that the hydrodynamic drive operates as a conventional hydraulic retarder. However, no additional units are needed to provide for operation in the hydraulic retarder mode inasmuch as the hydrodynamic drive itself becomes a hydraulic retarder. This arrangement provides for compactness of construction, the latter being further improved by situating the brake coupling in parallel with the shafts of the impeller and turbine.

During operation in this mode hydraulic fluid flows from the vanes of the rotating impeller onto the vanes of the stationary impeller and the kinetic energy given off by the fluid converts into heat. The resultant loss of energy causes the power consumer to slow down, whereby an optimum operating speed is attained. This mode of operation is effected with the engine disconnected from the power consumer, since, according to the arrangement of the reversing hydromechanical transmission described above, when the brake coupling is engaged, the reversing gear clutches are disengaged. Thus provision is made against the engine operating as a brake with attendant increase in engine wear, exhaust pollution of the atmosphere, operating noise, and other unwanted phenomena.

Moreover, the regulated version of the hydrodynamic drive is particularly efficient when working as a hydraulic retarder inasmuch as regulation of the power of the hydrodynamic drive, for example, by varying the pitch of the stator vanes provides a means of regulating the speed of movement of the power consumer.

It is further desirable that the output shaft of the gearbox incorporated in the reversing hydromechanical transmission be rigidly connected to the shaft of the impeller incorporated in the hydrodynamic drive, whereby torque limitation in lower gears may be effected.

With this connection of the units, the reversal of the hydromechanical transmission is carried out in the following manner:

As the power consumer moves in one direction, the reversing gear clutch transmitting power for this movement is put out of engagement and the clutch transmitting power for movement in reverse is engaged. Since the output shafts of the reversing gear are connected through the gearbox to the impeller shaft, reversal of the impeller is effected in a substantially short period, the intensity of the reversal being determined by quickness of shifting the reversing gear clutches. However, the reversal of the turbine shaft and the power consumer connected therewith takes more time and depends on the rate of change of the fluid flow in the hydrodynamic drive. The reversal period is at least 2-3 seconds, which is quite acceptable.

The smoothness of the characteristics of the hydrodynamic drive provides for smooth reversal of the turbine shaft and, consequently, the power consumer.

According to the construction described above, gearbox shifting results in changing gear ratios between the engine shaft and the impeller shaft with resultant variation of impeller rotational speed. For use of the reversing hydromechanical transmission in a road roller, gearbox ratios are chosen so that in higher gears, when the power consumer develops the maximum speeds of movement, the impeller runs at such a rotational speed as to enable the hydrodynamic drive, whose cubic power depends on the impeller speed, to consume all or nearly all the engine power.

It follows that in lower gears which give high gear ratios and, consequently, low speeds of movement of the power consumer, the impeller runs at a decreased rotational speed and, consequently, the power consumed by the hydrodynamic drive is decreased.

This provides for limiting the torque developed by the turbine of the hydrodynamic drive and transmitted to the power consumer. Hence, with a certain choice of transmission parameters, slippage of the road roller rolls or wheels in the process of reversal is completely excluded because it is always possible to choose gearbox ratios and the parameters of the vane system of the hydrodynamic drive so that the maximum torques developed by the turbine and transmitted to the power consumer will not exceed the values appropriate to the normal adhesion of the road roller rolls or wheels.

It is still further desirable that in the reversing hydromechanical transmission whose hydrodynamic drive has a power regulating device the control of which is provided with a limiter of the travel thereof the gearshift lever of the gearbox be interlocked with said limiter of control travel, said limiter being movably mounted in such a manner that shifting the gearbox into lower gears increases the travel of said control, whereby the power of the hydrodynamic drive is increased, whereas shifting the gearbox into higher gears decreases the travel of said control, the power of the drive being thereby decreased.

This interlocking provides for establishing full accordance between the gear selected in the gearbox and the power consumed by the hydrodynamic drive. In this way provision is made not only for limiting torque in lower gears in order to prevent slippage of the road roller rolls or wheels, but also for fully using the maximum permissible torque appropriate to normal adhesion of the road roller rolls or wheels, whereby optimum operating conditions are provided for reversal of the power consumer.

It is still further desirable that in the reversing hydromechanical transmission the gearbox thereof should have another output shaft kinematically connected with the gearbox output shaft through a gearing having an odd number of gears and a sliding clutch with a device for control thereof, said other output shaft of the gearbox being rigidly connected to the turbine shaft, the device for control of the sliding clutch being interlocked with the device for control of the reversing gear clutches in such a manner that in the process of braking the power consumer the sliding clutch is in engagement when the reversing gear clutches are out of engagement, the braking of the power consumer being thus effected without expending engine energy due to the impeller and the turbine rotating in opposite directions.

This constructional arrangement makes it possible to effect the braking of the power consumer with the engine disengaged from the transmission, whereby the engine operating conditions are improved and the life of the engine is increased.

Due to the fact that the impeller and the turbine are connected through a gearing having an odd number of gears and through a sliding clutch, the engagement of the sliding clutch causes the impeller and the turbine to rotate in opposite directions, whereby the kinetic energy of the power consumer is converted into heat raising the temperature of the hydraulic fluid in the hydrodynamic drive and the power consumer is intensively braked.

It is still further desirable that in the reversing hydromechanical transmission the gearbox output shaft be kinematically connected to the gearbox input shaft by means of one engaging clutch with a device for control thereof, the gearbox having another output shaft kinematically connected to the gearbox input shaft by means of another engaging clutch with a device for control thereof, said other output shaft of the gearbox being rigidly connected to the turbine shaft, the devices for control of both clutches being interlocked with each other so that when one of the clutches is engaged the other is disengaged, whereby the transmission of power from the engine to the power consumer, with said other clutch engaged, is effected without the use of the hydrodynamic drive.

With this constructional arrangement, transmission of engine power to the consumer thereof can be effected in some gearbox gears, usually higher or the so called transport gears, bypassing the hydrodynamic drive, whereby the efficiency of the transmission is increased and economies in engine fuel consumption can be effected in certain cases.

The reversing hydromechanical transmission constituting the present invention provides substantially smooth reversal of the power consumer with reduced engine energy expended for the purpose and has a substantially simple and dependable construction.

Now an embodiment of the invention will be described in detail with reference to the accompanying drawings in which:

FIG. 1 is a diagrammatic view of the reversing hydromechanical transmission according to the invention;

FIG. 2 is a diagrammatic view of the reversing hydromechanical transmission wherein the output shaft of the gearbox is coupled to the shaft of the impeller incorporated in the hydrodynamic drive and is kinematically connected to the brake coupling situated in parallel with the shafts of the impeller and turbine incorporated in the hydrodynamic drive, the latter being constructed in the form of a hydraulic torque converter;

FIG. 3 is a diagrammatic view of the arrangement for interlocking the devices for control of the brake coupling (shown in an enlarged view) and the reversing gear clutches;

FIG. 4 is a diagrammatic view of the reversing hydromechanical transmission wherein the output shaft of the gearbox is rigidly connected to the shaft of the impeller incorporated in the hydrodynamic drive, the latter being constructed in the form of a hydraulic torque converter provided with a device for regulating power thereof and a limiter of the travel of the control of said device;

FIG. 5 is a diagrammatic view of the control of the device for regulating power of the hydraulic torque converter, the limiter of the travel of the control being interlocked with the gearbox gearshift lever;

FIG. 6 shows curved illustrating the relationship of engine torque to engine rotational speed, as referred to the torque converter impeller shaft, compared with curves illustrating the relationship between the input torque of the torque converter having a device for regulating power thereof and the rotational speed of the impeller shaft;

FIG. 7 shows curves illustrating the relationship between the engine output torque and the speed of movement of the power consumer, the engine torque supplied to the power consumer being converted in the reversing hydromechanical transmission constructed according to the diagrammatic view in FIGS. 4 and 5;

Figure 10:
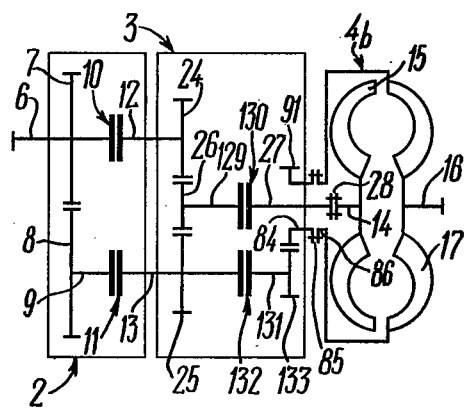
Figure 11:
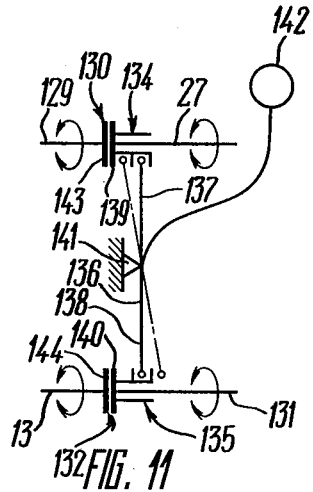

FIG. 10 is a diagrammatic view of the reversing hydromechanical transmission wherein one output shaft of the gearbox is kinematically connected to the input shaft thereof through an engaging clutch and is rigidly connected to the impeller shaft and the other output shaft of the gearbox is kinematically connected to the input shaft thereof through another engaging clutch and is rigidly connected to the shaft of the runner incorporated in the hydrodynamic drive constructed in the form of a fluid coupling;

FIG. 11 is a diagrammatic view of the interlocked devices for control of both engaging clutches in the hydromechanical transmission constructed according to FIG. 10.

The reversing hydromechanical transmission constituting the present invention comprises an engine 1 (FIG. 1), a reversing gear 2 directly connected to said engine, a gearbox 3, and a hydrodynamic drive 4 directly connected to a power consumer 5.

The input shaft 6 of the reversing gear 2 is connected to the shaft 1a of the engine 1 and mounts an input gear 7 arranged to mesh with a gear 8 mounted on the shaft 9 of the reversing gear 2.

The reversing gear 2 is provided with two controlled clutches 10 and 11 designed to transmit forward and reverse drive respectively and has two output shafts 12 and 13 for forward and reverse drive respectively.

The hydrodynamic drive 4 comprises a shaft 14 mounting an impeller 15, and a shaft 16 mounting a turbine 17. The shaft 16 is connected to the power consumer 5.

The hydrodynamic drive 4 depicted in FIG. 1 comprises a stator 18 and is essentially a hydraulic torque converter. The reference numeral 4 will also be used hereinafter to designate the hydraulic torque converter.

The torque converter 4 employed in the present invention is a reversible unit, i.e. it transmits power with the shafts 14 and 16 rotating in the forward and reverse directions. In both modes of operation the torque converter maintains high parameters such as efficiency and equal energy consumption.

As shown in FIG. 1, the output shafts 12 and 13 of the reversing gear 2 are connected through the gearbox 3 to the shaft 14 of the impeller 15 incorporated in the hydrodynamic drive 4, whereas the shaft 16 of the turbine 17 is connected to the power consumer 5. The output shafts 12 and 13 of the reversing gear 2 serve also as input shafts of the gearbox 3 and are designated by the same reference numerals.

Owing to this constructional arrangement, in the event of abrupt engagement of the controlled clutches 10 and 11 incorporated in the reversing gear 2 reversal of the power consumer 5 is effected smoothly notwithstanding the possibility of sharp variation in the rotational speed of the reversing gear output shafts 12 and 13. This is attributed to the fact that the hydrodynamic drive 4 provides smooth variation of the rotational speed of the shaft 16 of the turbine 17 for any manner of change in the rotational speed of the impeller shaft 14, including sudden speed changes.

In another embodiment the output shafts 12 and 13 of the reversing gear 2 are connected through the gearbox 3 not only to the impeller shaft 14, but also to the shaft 16 of the turbine 17, which is not shown in FIG. 1 and will be discussed later herein.

The reversing hydromechanical transmission wherein kinematic connections between the engine 1, the reversing gear 2, the gearbox 3, the hydrodynamic drive 4 and the power consumer 5 are as shown in FIG. 1 is enabled to efficiently work as a hydraulic retarder by provision of a brake coupling 19 (FIG. 2). The other units of such a hydromechanical transmission are of the same construction as in the transmission depicted in FIG. 1.

The operation in the mode of a hydraulic retarder is efficient when the hydromechanical transmission is used in the drive of a slewing superstructure of an excavator or a crane, a hoisting winch, or in some road rollers, for example, pneumatic-tired or super-heavy road rollers designed for finish work. The brake coupling 19 consists of a stationary blocking half-coupling 20 and a drive half-coupling 21 mounted on a shaft 22 which also mounts a gear 23.

The forward drive output shaft 12 and reverse drive output shaft 13 of the reversing gear 2 incorporated in such a reversing hydromechanical transmission extend into the gearbox 3 and mount a forward drive gear 24 and a reverse drive gear 25. The output shafts 12 and 13 of the reversing gear 2 serve also as input shafts of the gearbox 3 and are designated by the same reference numerals.

Gears 24 and 25 are in mesh with a gearbox central gear 26 mounted on a gearbox output shaft 27 which is rigidly connected by means of a coupling 28 to the shaft 14 of the impeller 15 incorporated in the hydraulic torque converter 4.

The device 29 (FIG. 3) for control of the brake coupling 19 consists of a slide 30 mounted in guides 31 and connected by means of a rod 32 with the blocking half-coupling 20 whose projections are located in grooves 33 provided in the casing 34 of the gearbox 3, whereby the blocking half-coupling 20 is prevented from rotation, but is allowed to have a translational motion provided by the slide 30.

The device 35 for control of the clutches 10 and 11 incorporated in the reversing gear 2 consists of a three-armed lever 36 two ends of which are located at the opposite sides of a support 37, whereby they are enabled to move in opposite directions, and are articulated respectively to the clutches 10 and 11 of the reversing gear 2. By pivoting the lever 36 about the support 37, engagement of the forward drive clutch 10 or the reverse drive clutch 11 is effected.

Interlocking of the device 29 for control of the brake coupling 19 and of the device 35 for control of the reversing gear clutches 10 and 11 is provided by articulating the third end 36a of the three-armed lever 36 to the slide 30 by means of a rod 38.

The lever 36 is connected to a handle 39 and is adapted to be operated thereby and to turn about the support 37, whereby the forward drive clutch 10, the brake coupling 19 and the reverse clutch 11 are engaged in succession. When moving in the opposite direction, the lever engages first the brake coupling 19 and then the forward drive clutch 10. The broken line in FIG. 3 shows the position of the three-armed lever 36 when engaging the reverse drive clutch 11, the positions of the rod 38, the slide 30 and the blocking half-coupling 20 being also shown. In this position the blocking half-coupling 20 is disengaged from the driven half-coupling 21 as shown by the broken lines.

Due to the incorporation of the brake coupling 19 in the gearbox 3 as shown in FIG. 2 and the provision for interlocking the devices 29 and 35 for control of, respectively, the brake coupling 19 and the clutches 10 and 11, the transmission, when working in the reverse mode of operation, retards the movement of the power consumer 5 without loading the engine 1, whereby the unwanted use of the engine as a brake is avoided.

The location of the brake coupling 19 in parallel with the shafts 14 and 16 of the hydraulic torque converter 4 provides for an axial compactness of the construction.

In another embodiment wherein the reversing hydromechanical transmission incorporating the reversing gear 2 described above and having the same kinematic connections as shown in FIG. 1 is designed for use in a road roller, the gearbox 3 has two speeds as shown in FIG. 4. In other embodiments the gearbox 3 may have more than two speeds. The output shafts 12 and 13 of the reversing gear 2 extend into the gearbox 3 and mount gears 24 and 25 respectively, said gears being meshed with the central gear 26. Inasmuch as the output shafts 12 and 13 of the reversing gear 2 extend through the gearbox 3 they serve also as input shafts thereof.

The forward drive output shaft 12 of the reversing gear 2 extends into the gearbox 3 as shown in FIG. 4. The shaft 12 mounts another forward drive gear 40 meshing with another central gear 41 which is made integral with the right, as shown, jaw-type half-coupling 42. The central gear 26 is connected by means of a shaft 43 with the left, as shown, jaw-type half-coupling 44.

A central control cam 45 is mounted on the splines of the gearbox output shaft 27 and connected to the gearshift lever 46 of the gearbox 3.

In the transmission shown in FIG. 4, the hydrodynamic drive is provided with a device 47 for regulation of the drive power. The device 47 comprises a stator 18 constructed in the form of variable-pitch vanes 18a with cranks 18b adapted for articulated connection to a control sleeve 48 which is linked by means of an articulated joint 49 to a control lever 50 mounted on a support 51. Such a hydrodynamic drive is essentially a regulated hydraulic torque converter and is designated by the reference numeral 4a.

The control sleeve 48 has abutments 52 adapted to mate with a sleeve stop 53.

The sleeve stop 53 is adapted to be moved, as shown in FIG. 5, by means of a four-member linkage 54 (FIG. 5) operated by a hydraulic cylinder 55. This constructional arrangement provides for regulating the power of the hydrodynamic drive (which is a regulated torque converter in this case) at the extreme positions of the control sleeve 48 (not shown in FIG. 5) determined by the contact of the abutments 52 with the sleeve stop 53.

The hydraulic cylinder 55 consists of a conventional movable barrel 56 and piston 58 secured to a fixed support 57.

The linkage 54 has two opposite articulated joints 59 and 60 which are mounted, respectively, on the barrel 56 and the fixed support 61.

When the barrel 56 is in the position shown by the broken line in FIG. 5, the linkage 54 is extended vertically. Under this condition the sleeve stop 53 is moved apart vertically so that the travel of the movable abutments 52 is greater than in the position indicated by the continuous lines. Inasmuch as the abutments 52 are rigidly secured to the control sleeve 48 as shown in FIG. 4, the travel of the control sleeve 48 is greater when the barrel 56 is in the position shown by the broken line in FIG. 5.

In the reversing hydromechanical transmission described herein, the regulated hydraulic torque converter 4a is of the reversing type and maintains high parameters with the shafts 14 and 16 rotating in both forward and reverse directions.

In the reversing hydraulic torque converters 4a the control sleeve 48 has a neutral centre position corresponding to the minimum power of the hydraulic torque converter 4a, two extreme positions (not shown) corresponding to the maximum power, viz. one position for forward rotation and the other position for reverse rotation of the shafts 14 and 16, and intermediate positions (not shown).

The arrangement employing the linkage 54 as depicted in FIG. 5 provides for regulating the power of the regulated hydraulic torque converter 4a.

The barrel 56 of the cylinder 55 is connected to a hydraulic pump 62 and a tank 63 by means of pipelines 64. Pipelines 65 connect a conventional safety valve 66 to the hydraulic pump 62 and the tank 63.

The hydraulic pump 62 delivers the working fluid from the tank 63 through the pipelines 64 to the cylinder 55. Part of the fluid is passed back through the pipelines 65 to the tank 63 via the conventional safety valve 66, whereby the hydraulic pump 62, the cylinder 55 and the other components of the hydraulic system are protected from overpressure.

Pipelines 67 put in communication the spaces (not shown) of the hydraulic cylinder 55 with the tank 63 through a three-position hydraulic control valve 68. The handle 69 of the hydraulic control valve 68 by means of a lever 70 is connected to the central cam 45 of the gearbox 3. The lever 70 has a support and is made two-armed.

Owing to the hydrokinematic interlocking of the gearbox gearshift lever 46 employing the limiter 53 of the travel of the control, which control is constructed in the form of the sleeve 48 arranged to control the regulated hydraulic torque converter 4a, shifting the gearbox 3 into lower gears increases the travel of the control sleeve 48, whereby the power of the regulated hydraulic torque converter 4a is increased, with the torque converter shafts 14 and 16 rotating in either direction.

The effect involved is explained in FIG. 6 and 7. Referring to FIG. 6, torques $M_1$ are set off on the ordinate axis. The parabola 72 representing the input torque of the regulated torque converter 4a is a function of the rotational speed "n" of the shaft 14 and intersects the engine torque line 73 at the point 74 at the instant of shifting the gearbox 3 into a higher gear. For shifting the gearbox 3 into a lower gear, the engine torque as a function of the rotational speed "n" of the shaft 14 is represented by the line 75, the intersection of this line with the parabola 72 being at the point 76.

Referring to the interlocking arrangement shown in FIG. 5, shifting the gearbox 3 into a lower gear causes the limiter 53 of the travel of the control sleeve 48 to take the position indicated by the broken lines in FIG. 5, due to which the power of the regulated hydraulic torque converter 4a depicted in FIG. 4 increases and the parabola representing the input torque of the regulated hydraulic torque converter 4a assumes the position 77, the point of intersection of the parabola with the engine torque line 75 taking the position 78.

In FIG. 7 the ordinates are torques $M_2$ on the power consumer 5, for example, on the roll of a road roller, whereas the abscissae are the lineal speeds V of said power consumer.

With the gearbox 3 in a higher gear, in the event of coincidence of the characteristics of the engine 1 and the regulated hydraulic torque converter 4a at the point 74, the line 79 is the curve representing the output torque on the power consumer 5, i.e. on the road roller roll, in relation to the speed V thereof. This line, throughout the length thereof, is below the straight line 80 indicating the permissible output torque appropriate to proper roll adhesion.

With the gearbox 3 in a lower gear, in the event of coincidence of the characteristics of the engine 1 and the regulated torque converter 4a at the point 76, the output torque is represented by the curve 81. In the event of using the interlocking arrangement as shown in FIG. 5, the curves 75 and 77 intersecting at the point 78, the output torque curve changes into the line 82 located in the vicinity of the line 80 representing the permissible output torque. This condition provides for using the roll adhesion to the best.

The line 83 shows the relation of the output torque $M_2$ to the road roller travel speed V in the case where the gearbox 3 is located after the hydraulic torque converter and the intersection of the curves 72 and 73 in all gearbox speeds is at the point 74. In this case the line 83 is above the straight line 80 with the resultant possibility of roll slippage.

The embodiment of the present invention depicted in FIGS. 4 and 5 practically eliminates the possibility of roll slippage and thus provides substantial improvements in the quality of road building work.

Figure 8:
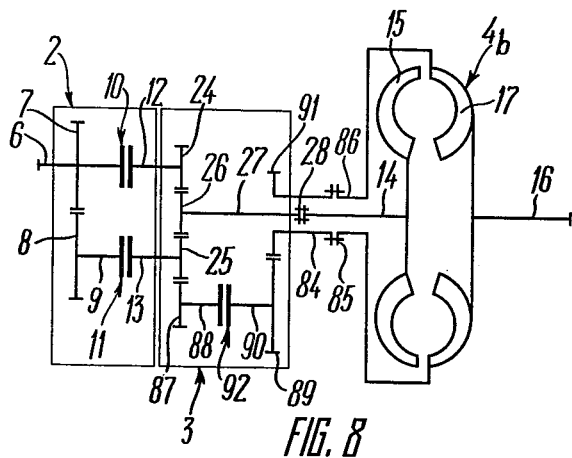
FIG. 8 is a diagrammatic view of the reversing hydromechanical transmission wherein one output shaft of the gearbox is rigidly connected to the impeller shaft and the other output shaft of the gearbox is connected through a gearing having an odd number of gears and through a sliding clutch to the shaft of a runner incorporated in the hydrodynamic drive constructed in the form of a fluid coupling.

The embodiment of the reversing hydromechanical transmission designed for use in a hoisting winch is shown in FIG. 8. The reversing gear 2 is of the same construction as shown in FIG. 1. Like in FIG. 1, the shaft 1a of the engine (not shown) is connected to the input shaft 6 of the reversing gear 2 whose output shafts 12 and 13 extend into a gearbox 3, thereby serving as the input shafts thereof. As shown in FIG. 8, the ends of said shafts mount, respectively, gears 24 and 25 which are connected with a central gear 26 mounted on the output shaft 27 of the gearbox 3.

The output shaft 27 is rigidly connected by means of a coupling 28 to the shaft 14 of an impeller 15 incorporated in a hydrodynamic drive constructed in this embodiment in the form of a fluid coupling also designated by the reference numeral 4b.

The fluid coupling 4b differs from the hydraulic torque converter 4 in that it is not provided with a stator 18 and comprises only two working members, viz. an impeller 15 and a turbine (runner) 17. Further difference lies in that the hydraulic torque converter 4 is a reversing unit, i.e. it transmits power with the shafts 14 and 16 rotating in either direction, the energy consumption of the torque converter remaining the same in either case.

The gearbox 3 also incorporates another output shaft 84 (FIG. 8) which is rigidly connected by means of a coupling 85 to the casing 86 of the turbine 17 incorporated in the fluid coupling 4b.

A gear 87 mounted on a shaft 88 is in mesh with the gear 25.

A gear 89 mounted on a shaft 90 is in mesh with a gear 91 mounted on the other output shaft 84 of the gearbox 3.

The shafts 88 and 90 are interconnected by a sliding clutch 92.

With this constructional arrangement of the reversing hydromechanical transmission, the connection between the output shaft 27 and the other output shaft 84 of the gearbox 3 is effected through a sliding clutch 92 and a gearing consisting of five gears 25, 26, 87, 89, 91, i.e. through an odd number of gears.

With the shafts 27 and 84 of the gearbox 3 connected in the manner described above, said shafts are adapted to rotate in different directions when the sliding clutch 92 is in engagement. In virtue of the rigid connection effected by means of the coupling 28 between the output shaft 27 of the gearbox 3 and the shaft 14 of the impeller 15, and the rigid connection between the other output shaft 86 of the gearbox 3 and the turbine 17, the impeller and the turbine of the fluid coupling 4b are adapted to rotate in opposite directions when the sliding clutch 92 is in engagement.

This constructional arrangement provides for efficient operation of the hydromechanical transmission in the reverse mode with the reversing gear clutches 10 and 11 disengaged, since the energy delivered from the power consumer 5 (not shown in FIG. 8) to the shaft 16 of the turbine 17 is converted into heat due to rotation in opposite directions of the turbine 17 and the impeller 15 of the fluid coupling 4b, whereby braking of the power consumer 5 is effected.

Figure 9:
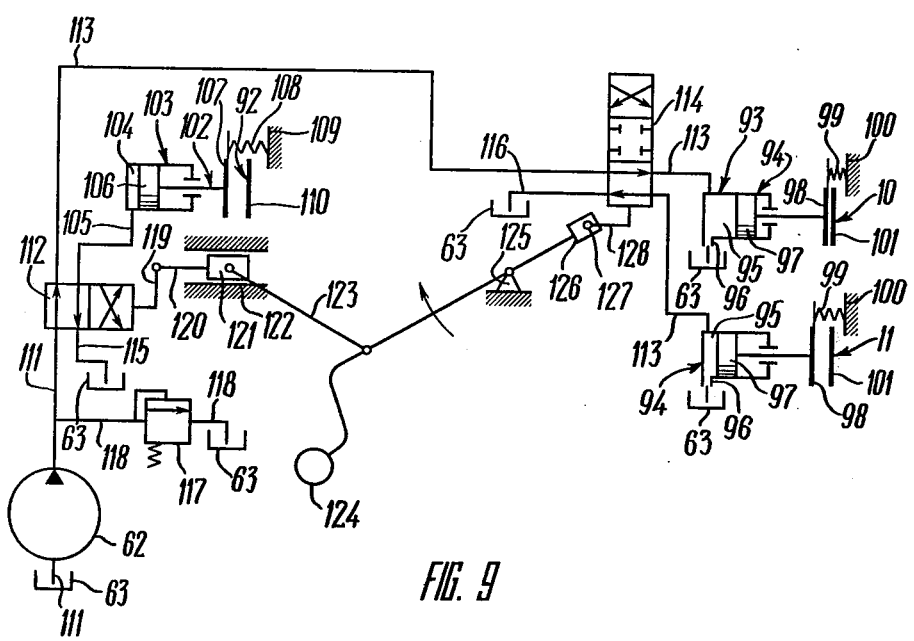
FIG. 9 is a diagrammatic view of the device for control of the sliding clutch, said device being interlocked with the device for control of the reversing gear clutches.

Shown in FIG. 9 is a device 93 for control of the forward drive clutch 10 and the reverse drive clutch 11 of the reversing gear 2. Said device consists of two hydraulic cylinders 94 whose spaces 95 communicate with the tank 63 through jets 96, whereas pistons 97 are connected to blocking members 98 of the clutches 10 and 11, the projections thereof bearing on supports 100 through springs 99.

The clutches 10 and 11 consist of blocking members 98 and driven members 101.

A device 102 for control of the sliding clutch 92 also consists of a hydraulic cylinder 103 whose space 104 has an inlet passage 105. The cylinder 103 incorporates a piston 106 which is connected to a clutch blocking member 107 whose projections bear on a support 109 through a spring 108. The sliding clutch 92 comprises, apart from the blocking member 107, a driven member 110.

The hydraulic cylinders 94 are connected with the hydraulic pump 62 and the tank 63 by means of pipelines 111, a two-position hydraulic control valve 112, pipelines 113 and a three-position hydraulic control valve 114.

The hydraulic cylinder 103 is connected with the hydraulic pump 62 and the tank 63 by means of the pipelines 111, the two-position hydraulic control valve 112 and the inlet passage 105.

Pipelines 115 and 116 connect the drain passages (not shown) of the hydraulic control valves 112 and 114, respectively, with the tank 63.

A conventional safety valve 117 connects the pipeline 111 to the tank 63 via pipelines 118 and protects the hydraulic pump 62 and other components of the hydraulic system from over-pressure.

The hydraulic control valve 112 is operated by means of a handle 119 which is connected by means of a rod 120 to a slide 121 adapted to have a translational motion in guides 122. The slide 121 is connected by means of a rod 123 to one end of a handle 124 which serves for controlling the reversing gear 2.

The control handle 124 is mounted on a support 125 and has a slot 126 which accommodates a pin 127 secured to a handle 128 which serves for operating the three-position control valve 114.

This constructional arrangement of the interlocking of the devices for control of the reversing gear clutches 10 and 11 and the sliding clutch 92 provides for separate and successive engagement of the reversing gear forward drive clutch 10, the slide clutch 92 and the reversing gear reverse drive clutch 11. Due to this provision, forced braking of the power consumer is effected by virtue of converting the kinetic energy of the fluid in the fluid coupling 4b into heat, inasmuch as, when the sliding clutch 92 is in engagement, the impeller 15 and the turbine 17 of the fluid coupling 4b rotate in opposite directions. Since the reversing gear clutches 10 and 11 are out of engagement under these conditions, the power consumer 5 (not shown in FIGS. 8 and 9) is intensively braked without imposing load on the engine 1 (not shown in FIGS. 8 and 9).

An embodiment of such a hydromechanical transmission intended for use in a road roller is shown in FIG. 10.

In this embodiment of the hydromechanical transmission, which comprises a reversing gear 2 and a fluid coupling 4b, and is essentially of the same construction as shown in FIG. 8 to another scale, the output shafts 12 and 13 of the reversing gear 2 are also arranged to extend into a gearbox 3, thus being the input shafts thereof. The shaft 1a of the engine 1 (not shown) is connected to the input shaft 6 of the reversing gear 2, the same as in the embodiments shown in FIGS. 1 and 8, and the shaft 16 of the turbine 17 is connected like in FIGS. 1 and 8 to the power consumer 5 (not shown).

Shafts 12 and 13 incorporated in the gearbox 3 mount, respectively, gears 24 and 25 which are in mesh with a central gear 26.

The output shaft 27 of the gearbox 3 is connected by means of a coupling 28 to the shaft 14 of an impeller 15.

This embodiment of the reversing hydromechanical transmission has another output shaft 84 of the gearbox 3, said shaft being connected by means of a coupling 85 to the casing 86 of the turbine 17 incorporated in the fluid coupling 4b.

The output shaft 27 of the gearbox 3 is connected by means of an engaging clutch 130 (FIG. 10) to the shaft 129 carrying the central gear 26 and has one more output shaft which, in this case, is the aforesaid other output shaft 84 with a gear 91 mounted thereon.

The reverse drive output shaft 13 of the reversing gear 2 extends into the gearbox 3 and is connected to a shaft 131 by means of another engaging clutch 132. The shaft 131 mounts a gear 133 which meshes with the gear 91.

In this embodiment the other output shaft 84 is rigidly connected by means of the coupling 85 to the casing 86 of the turbine 17.

Owing to this constructional arrangement, power can be transmitted from the engine 1 (not shown) to the power consumer 5 (not shown) through the fluid coupling 4b, with the clutch 130 engaged and the clutch 132 disengaged, as well as bypassing the fluid coupling 4b, with the clutch 132 engaged and the clutch 130 disengaged. In the latter case fuel economy is effected due to avoiding loss of energy in the fluid coupling 4b, whereas in the former case smooth reversal is obtained.

The device 134 (FIG. 11) for control of the clutch 130 is interlocked with the device 135 for control of the other clutch 132 by means of a two-arm lever 136 whose ends 137 and 138 are articulated to clutch members 139 and 140 respectively, said clutch members being movable with respect to their associated shafts 27 and 131. The two-arm lever 136 is centrally mounted on a support 141 and has a control handle 142.

The clutch 130 consists of a movable member 139 and a driven member 143. The clutch 132 consists of a movable member 140 and a driven member 144.

Due to this interlocking arrangement, engaging the clutch 130 causes disengagement of the clutch 132 and, conversely, engaging the clutch 132 causes disengagement of the clutch 130.

The reversing hydromechanical transmission constituting the present invention and constructed according to FIG. 1 operates as follows:

Power is transmitted from the shaft 1a of the engine 1 through the shaft 6, gears 7, 8 and the shaft 9 to the forward drive clutch 10 and the reverse drive clutch 11 of the reversing gear 2.

With one of the clutches 10 and 11 engaged, power is transmitted through the shafts 12 and 13 to the gearbox 3. The direction of rotation depends on whether the forward drive clutch 10 or the reverse drive clutch 11 is in engagement.

The output shaft 27 of the gearbox 3 drives the impeller 15 of the hydraulic torque converter 4 through the coupling 28 and the shaft 14.

Thus, the direction of rotation of the impeller 15 is also determined by engaging one of the clutches incorporated in the reversing gear 2, viz. the forward drive clutch 10 or the reverse drive clutch 11. Switching over said clutches causes reversal of the impeller 15.

The turbine 17 of the hydraulic torque converter 4 is connected to the impeller 15 through the medium of the working fluid circulating therebetween.

As the impeller 15 of the hydraulic torque converter 4 rotates, the working fluid is thrown by the impeller vanes (not shown) from the centre to the periphery. Leaving the ends of the vanes of the impeller 15, the fluid enters the vanes (not shown) of the turbine 17 and gives its kinetic energy to said turbine, causing it to rotate. As the fluid leaves the vanes of the turbine 17, flowing inwards, it enters the vanes (not shown of the stator 18 and, on being redirected by the stator into the vanes of the impeller 15, continues its circulating motion.

The embodiment of the hydromechanical transmission constructed in accordance with FIGS. 8 and 10 in the form of a fluid coupling designated by the reference numeral 4b operates substantially likewise.

However, since the fluid coupling has no stator, the working fluid, flowing inwards through the vanes of the turbine 17, passes direct into the vanes of the impeller 15. Due to the absence of a stator 18, the fluid coupling 4b is simpler in construction than the hydraulic torque converter 4. Yet, inasmuch as in the torque converter 4 the working fluid is set to flow into the vanes of the impeller 15 in the direction determined by the stator 18, the shape of the stator vanes can be chosen so as to enable the torque converter 4 to work at a high efficiency over a wider range than the fluid coupling 4b. There are also other differences in the output characteristics of the torque converter 4 and the fluid coupling 4b, for example, in the input output torque ratio.

In some embodiments of the reversing hydromechanical transmission, for example, in the embodiment constructed in accordance with FIG. 4, the hydraulic torque converter 4a is made in a regulated form for which purpose it is provided with a power regulating device 47. The regulation of power is effected by varying the pitch of the vanes 18a of the stator 18, whereby the vanes change the direction of the working fluid entering the impeller 15. In this way the action of the working fluid on the impeller 15 is changed and regulation of power is effected.

In all the embodiments of the present invention, the hydrodynamic drive 4 is reversible, i.e. it transmits power with the impeller 15 and the turbine 17 rotating in either direction.

The hydrodynamic drive 4 has the same energy consumption with both directions of rotation of the impeller 15 and the turbine 17, a substantially high efficiency and other parameters which remain the same in reversal.

The reversible hydrodynamic drive 4 may be made in the form of a fluid coupling with the impeller 15 and the turbine 17 of the conventional construction as well as in the form of fluid couplings and torque converters of special design.

During reversal of the impeller 15, the fluid flow changes. For example, when the impeller 15 rotates in the forward direction, the fluid flows from the impeller vanes outwards and beyond the plane of the drawing, whereas, when the impeller 15 rotates in the reverse direction, the fluid flows from the impeller vanes outwards and from the plane of the drawing.

This change of the fluid flow causes, with time and in accordance with certain laws, reversal of the turbine 17 and the power consumer 5 connected thereto by the shaft 16.

Inasmuch as the change of the fluid flow in the hydrodynamic drive 4 is a smooth process, the reversal of the power consumer 5 is effected substantially smoothly and only insignificantly depends on the smoothness of switching over the clutches 10 and 11 of the reversing gear 2.

The operation of the hydromechanical transmission constructed according to FIGS. 2 and 3 will now be described. When the handle 39 of the three-armed lever 36 is moved on the support 37 into the position shown in FIG. 3 by the broken line, the reverse drive clutch 11 of the reversing gear 2 is put in engagement, the forward drive clutch 10 and the brake coupling 19 being out of engagement.

Power from the shaft 1a of the engine 1 is transmitted to the input shaft 6 of the reversing gear 2, thence via the pair of the gears 7 and 8 to the shaft 9 and thence, via the reverse drive clutch 11, to the reversing gear output shaft 13 which extends into the gearbox 3. Owing to the use of the pair of the gears 7 and 8, the shaft 9 rotates in the direction opposite to the rotation of the reversing gear input shaft 6 and, consequently, the shaft 1a of the engine 1.

From the shaft 13 power is transmitted through the pair of the gears 25 and 26 to the output shaft 27 of the gearbox 3 and thence, via the coupling 28, to the shaft 14 of the impeller 15 incorporated in the hydraulic torque converter 4. The impeller 15 imparts energy to the working fluid circulating in the torque converter 4 and the working fluid transmits the energy to the turbine 17. After the process of reversal is completed, the impeller 15 and the turbine 17 run in the same direction.

From the shaft 16 of the turbine 17 power is transmitted to the power consumer 5.

When the handle 39 is moved into the centre position shown by the full lines in FIG. 3, the three-armed lever 36 assumes the centre position and the lever end 36a, acting through the rod 38, moves the slide 30 into the position farthest from the support 37 which is situated in line with the axis (not shown) of the guides 31. The slide 30, acting through the rod 32, moves the blocking half-coupling 20 to the right (as shown), forcing it against the driven half-coupling 21. Referring to FIG. 3, with the lever 36 in said position, the forward drive clutch 10 and the reverse drive clutch 11 are out of engagement.

Inasmuch as the free projections of the blocking half-coupling 20 are fitted in the grooves provided in the fixed casing 34 of the gearbox 3, the half-coupling 20 does not rotate. When the half-coupling 20 is engaged with the driven half-coupling 21, the latter is stopped, whereby the braking action of the brake coupling 19 is effected.

Stopping the half-coupling 21 stops the shaft 22 together with the gear 23 mounted thereto. Inasmuch as the gears 23, 24 and 26 are in mesh, the central gear 26 is stopped, whereby the output shaft 27 of the gearbox 3 and the impeller shaft 14 connected thereto by the coupling 28 are also stopped.

In the reverse mode of operation, i.e. when energy is delivered into the reversing hydromechanical transmission from the power consumer 5, the turbine 17 receives rotation in virtue of the turbine shaft 16 being connected with the power consumer 5.

With the impeller 15 stopped, the turbine 17 works as a pump, whereby the working fluid circulating in the hydraulic torque converter 4 is directed from the centre outwards to the periphery and thence to the vanes of the impeller 15. Since the impeller 15 is stopped, the working fluid imparts a considerable torque thereto, converting its kinetic energy into heat. In this way the power consumer 5 is retarded without expending engine energy, i.e. the hydraulic torque converter 4 works as a hydraulic retarder.

When the handle 39 is shifted into the right (not shown) position, the three-armed lever 36, acting through the rod 38, moves the slide 30 and, via the rod 32, the blocking half-coupling 21 away from the driven half-coupling 21, whereby the brake coupling 19 is disengaged.

The lower end (not shown) of the three-armed lever 36 engages the forward drive clutch 10 of the reversing gear 2, the reverse drive coupling 11 remaining out of engagement.

When the forward drive clutch 10 is in engagement, power from the shaft 1a of the engine 1 is transmitted through the shaft 6, the clutch 10, the shaft 12, the gears 24 and 26, the shaft 27 and the coupling 28 to the impeller shaft 14. With the forward drive clutch 10 engaged, the output shaft 12 of the reversing gear 2 rotates in the same direction as the shaft 1a of the engine 1.

The impeller 15 transmits enery to the working fluid circulating in the torque converter 4 and said working fluid imparts the energy to the turbine 17, whereby the turbine 17 is caused to rotate in the same direction as the impeller 15. The power consumer 5 receives power from the turbine 15 through the shaft 16.

Thus, the feature of the operation of the reversing hydromechanical transmission constructed as described above consists in that the hydrodynamic drive acts as a hydraulic retarder, which provides for a compact construction with the minimum of elements and good performance of the transmission.

Slow speeds of travel, particularly in braking a slewing superstructure of an excavator or a crane, lowering a load with a hoisting winch or driving a road roller downgrade, are obtained by converting the kinetic energy of the power consumer into heat which raises the temperature of the working fluid in the hydraulic torque converter 4. The operation of the reversing hydromechanical transmission in this mode is effected without loading the engine 1, whereby the use of the engine as a brake and the attendant shortening of the engine life as well as other unwanted phenomena are eliminated.

In the embodiment wherein the device 29 for control of the brake coupling 19 is interlocked with the device 35 for control of the reversing geaar clutches 10 and 11 according to the arrangement shown in FIG. 3 the operation of the handle 39 alone effects successive engagement of the forward drive clutch 10, the brake coupling 19 and the reverse drive clutch 11. Shifting the handle 39 in the opposite direction successively engages the brake coupling 10 and the forward drive clutch 10.

With this arrangement, engagement of each of the clutches 10 and 11 and the coupling 19 results in simultaneous disengagement of the two other units due to the use of the three-armed lever 36 each end of which is connected to one of said clutches and said coupling, the lever centre being connected to the support 37.

As mentioned above, the embodiments of the reversing hydromechanical transmission intended for use in a road roller are constructed as shown in FIGS. 4 and 5.

In these embodiments, full power is taken from the engine 1 with the gearbox 3 shifted into lower gears, whereas partial power is taken with the gearbox 3 shifted into lower gears, i.e. drive is transmitted through high gear ratios in order to provide for low speeds of road roller travel.

Like in the embodiment constructed according to FIG. 1, power from the engine 1 (not shown in FIG. 4) passes to the input shaft 6 of the reversing gear 2. With the forward drive clutch 10 engaged, power is transmitted to the reversing gear output shaft 12 which extends into the gearbox 3, the shafts 12 and 6 running in the same direction.

When the left jaw-type half-coupling 44 is engaged by the use of the lever 46, power is trasmitted from the shaft 12 through the pair of gears 24 and 26, the shaft 43, the left jaw-type half-coupling 44 and the central cam 45 to the input shaft 27 of the gearbox 3.

When the right jaw-type half-coupling 42 is engaged by the use of the lever 46, power is transmitted from the shaft 12 through the pair of the gears 40 and 41, the right jaw-type half-coupling 42 and the central cam 45 to the output shaft 27 of the gearbox 3.

Under these conditions the gear ratio of the gearbox 3 changes, depending on the gear tooth ratios in the pairs of the gears 24, 26 and 40, 41.

When the reverse drive clutch 11 of the reversing gear 2 is in engagement, power is transmitted through the clutch 11 to the other output shaft 13 of the reversing gear 2, the directions of rotation of the shafts 6 and 13 being contrary.

When the left jaw-type half-coupling 44 is engaged by the use of the lever 46, power is transmitted from the shaft 13 through the pair of the gears 25 and 26, the shaft 43, the left jaw-type half-coupling 44 and the central cam 45 to the output shaft 27 of the gearbox 3.

When the right jaw-type half-coupling 42 is engaged by the use of the lever 46, power is transmitted from the shaft 13 through the gears 25, 26, 24, the shaft 12, the pair of the gears 40 and 41, the right jaw-type half-coupling 42 and the central cam 45 to the output shaft 27 of the gearbox 3.

Under these conditions the gear ratio of the gearbox 3 changes, depending on the gear tooth ratios in the pairs of the gears 25, 26 or in the pairs 25, 24 and 40, 41 together.

Thus, power transmission from the shaft 6 to the impeller 15 incorporated in the hydraulic torque converter 4a and connected by means of the shaft 14 and the coupling 28 to the output shaft 27 of the gearbox 3 is effected in the direction determined by the engagement of the forward drive clutch 10 at two angular speeds determined by the selection of the jaw-type half-coupling 44 or 42 effected through the use of the lever 46, whereas power transmission in the other direction determined by the engagement of the reverse drive clutch 11 is also effected at two angular speeds determined by the selection of the jaw-type half-coupling 44 or 42 effected by the use of the lever 46.

Power is transmitted from the impeller 15 through the medium of the working fluid circulating in the torque converter 4a to the turbine 17 and thence to the shaft 16 connected to the power consumer 5 (not shown).

As shown in FIG. 6, engine torque, with the right jaw-type half-coupling 42 engaged, is represented by the curve 73, inasmuch as the gear ratio of the gearbox 3 is low, said gear ratio being determined by the tooth ratio in the pair of the gears 40 and 41 when the forward drive clutch 10 of the reversing gear 2 is in engagement, or by the tooth ratio in the pairs of the gears 25, 24 and 40, 41 when the reverse drive clutch 11 of the reversing gear 2 is in engagement.

Referring to FIG. 6, when the left jaw-type half-coupling 44 is engaged, the curve representing the torque of the engine 1 as a function of the rotational speed of the impeller shaft 14, as referred to said shaft 14, changes into curve 75 by virtue of the pairs of the gears 24, 26 with the forward drive clutch 10 of the reversing gear 2 engaged or by virtue of the pairs of the gears 25, 26 with the reverse drive clutch 11 engaged, inasmuch as in this case the gear ratio of the gearbox 3 is higher than when the right jaw-type half-coupling 42 is engaged, whereas the rotational speed of the shaft 1a of the engine 1 is slower.

When the gearbox 3 is in a higher gear, the parabola representing the torque of the impeller 15 in the torque converter 4a intersects the curve 73 representing the torque of the engine 1 at the point 74 corresponding to full power taken by the torque converter 4a from the engine 1.

The output torque of the road roller rolls in the first case, as a function of the roller lineal speed V is represented by the curve 79 (FIG. 7) located everywhere below the straight line 80 indicating the maximum permissible torque appropriate to the proper adhesion. This guarantees against roll slippage at any speeds of roller reversal.

When the gearbox 3 is in a lower gear, the parabola representing the torque of the impeller 15 in the torque converter 4a intersects the curve 75 representing the torque of the engine 1 at the point 76 corresponding to partial power taken by the torque converter 4a from the engine 1.

The output torque of the road roller rolls in the second case, as a function of the roller lineal speed V is represented by the curve 81 which is also located everywhere below the straight line 80. This condition also provides against roll slippage at any roller reversal speeds.

If the gearbox 3 were located after the reversing mechanism 2 and the hydraulic torque converter 4a, the curve 83 representing the output torque $M_2$ as a function of the roller lineal speed V would intersect the straight line 80. Under these conditions there would be no guarantee against roller slippage as during quick reversal the torque $M_2$ may exceed the permissible value.

In the embodiment wherein a regulated hydrodynamic drive is employed, for example, in the regulated hydraulic torque converter 4a depicted in FIG. 4 provision is made of a device 47 for control of the torque converter power the gearbox gearshift lever 46 is interlocked with the limiter 53 of the travel of the control sleeve 48 as shown diagrammatically in FIG. 5.

When the right jaw-type half-coupling 42 is engaged by the use of the lever 46, the lever 70 pivots about the support 71 and, acting through the handle 69, shifts the three-position hydraulic control valve 68 into the left position, thereby connecting the right side of the hydraulic cylinder 55 with the return line to the tank 63.

When the left jaw-type half-coupling 44 is engaged by the use of the handle 46, the lever 70 pivots about the support 71 and, acting through the handle 69, shifts the three-position hydraulic control valve 68 into the right position, thereby connecting the left side of the hydraulic cylinder 55 with the return line to the tank 63.

The hydraulic pump 62 delivers oil from the tank 63 through the pipelines 64 to both sides of the barrel 56 of the hydraulic cylinder 55.

When the right side of the cylinder 55 is connected to the return line, the cylinder barrel 56 is forced to the left (not shown) by the pressure of the oil confined in the left cylinder portion separated by the piston 58 which is fixed to the support 57.

Likewise, when the left side of the cylinder 55 is connected to the return line, the barrel 56 is forced to the right (as shown by the broken line).

When the barrel 56 of the hydraulic cylinder 55 is set to correspond with the shifting of the gearbox 3 into a higher gear, the linkage 54 is extended vertically, under which condition the travel of the stops 52 and also of the control sleeve 48 is limited by a shorter distance between the projections. Accordingly, the range of regulating the power of the regulated torque converter 4a is also limited by smaller maximum values appropriate to each direction of rotation of the shafts 14 and 16.

When the barrel 56 of the hydraulic cylinder 55 is set to correspond with the engagement of the left jaw-type half-coupling 44, which, as explained above, provides for shifting the gearbox 3 into a lower gear, said barrel 56 acts through the articulated joint 59 onto the linkage 54 whose opposite articulated joint 59 bears against the support 61.

This action extends the linkage vertically as shown by the broken line in FIG. 5 and the limiter 53 moves apart, thereby providing for increase in the travel of the stops 52 and, consequently, in the travel of the control sleeve 48.

This results in increase in the maximum values of the torque converter power obtainable with the stops 52 in contact with their limiter 53.

Thus, when the gearbox 3 is higher gears, the interlocking arrangement described above provides for using one range of the limiter 53, whereas the other limiter range is used when the gearbox 3 is in lower gears. Said ranges determine the maximum travel of the control sleeve 48 in either direction from its centre (neutral) position, the sleeve travel controlling the energy capacity of the hydraulic torque converter 4a.

When designing a reversing hydromechanical transmission, the relationship is established, by calculation or experiment, of the distance between the projections of the limiter 53 of the control sleeve 48 to the gear ratio of the gearbox 3 in a lower gear so that the parabola 78 representing the input torque of the torque converter 4a intersects the curve 75, which represents the engine torque as a function of the rotational speed of the shaft 14, in the point 78 (FIG. 6). Said point 78 permits the curve representing the output torque $M_2$ on the road roller roll as a function of the roller lineal speed V to be obtained in the form of the line 82 (FIG. 7) tangential to the straight line 80 indicating the maximum permissible torque $M_2$ appropriate to the proper roll adhesion.

This ensures against roll slippage during road roller reversal and provides for taking the maximum practicable power from the engine when operating with the gearbox 3 in lower gears, whereby the control of the road roller involved is simplified and improvement is effected in the rate and quality of road building work.

As stated above, the embodiment of the reversing hydromechanical transmission depicted in FIGS. 8 and 9 is intended for use in hoisting winches.

With the clutch 92 disengaged, this embodiment of the transmission operates substantially like that depicted in FIG. 1.

When the forward drive clutch 10 is in engagement, power delivered from the engine 1 (not shown) to the input shaft 6 of the reversing gear 2 is transmitted therefrom through the forward drive clutch 10, the shaft 12 and the gear 24 to the central gear 26.

When the reverse drive clutch 11 is in engagement, power delivered from the engine to the input shaft 6 of the reversing gear 2 is transmitted therefrom through the pair of the gears 7 and 8, the shaft 9, the clutch 11, the shaft 13 and the gear 25 to the central gear 26.

The direction of rotation of the central gear 26 is determined by selection of the clutch 10 or the clutch 11. When the clutch 10 is in engagement, the central gear 26 rotates in the direction opposite to the rotation of the shaft 6 connected to the engine 1. When the clutch 11 is in engagement, the central gear 26 rotates in the same direction as the shaft 6 inasmuch as power is transmitted through an even number of gears (the gears 7 and 8, the gears 25 and 26).

From the central gear 26 power is transmitted through the output shaft 27 of the gearbox 3, the coupling 28 and the shaft 14 to the impeller 15 of the hydrodynamic drive 4b, which in this particular case is constructed in the form of a fluid coupling.

Thus the impeller 15 rotates either forward or in reverse, depending on whether power is transmitted through the forward drive clutch 10 or the reverse drive clutch 11.

The impeller 15 imparts energy to the working fluid circulating in the fluid coupling 4b and the fluid, in turn, gives energy to the turbine 17 which is connected to the power consumer 5 (not shown) by the shaft 16.

Under static conditions, i.e. upon completion of the transitional processes of reveral, the turbine 17 runs in the same direction as the impeller 15 of the fluid coupling 4b.

When the clutch 92 is engaged and the forward drive clutch 10 and the reverse drive clutch 11 are simultaneously disengaged, which action will be explained below, the impeller 15 is connected to the turbine 17 by an odd number (five in this particular case) of gears, viz. the pair of the gears 91, 89 and the three gears 87, 25, 26, the intermediate shafts 88, 90, 84, 86, 13, 14 and 27, and couplings 28 and 85.

In this way provision is made for the impeller 15 and the turbine 17 of the hydrodynamic drive 4b to rotate in opposite directions. This mode of operation is used, for example, when the winch involved lowers the load by gravity or when the power consumer 5 is reversed on the go, i.e. by using the inertia of the moving power consumer, in other words, when the transmission works in the reverse mode, energy being transmitted thereto from the power consumer 5.

The arrangement constructed according to FIG. 9 for the purpose of interlocking the devices 93 for control of the clutches 10 and 11 of the reversing gear 2 with the device 102 for control of the sliding clutch 92 (FIG. 9) provides for successively effecting the following modes of transmission operation by the use of the handle 124 alone: forward drive (the clutch 10 of the reversing gear 2 is engaged), hydraulic retardation (the slide clutch 92 is engaged), reverse drive (the clutch 11 of the reversing gear 2 is engaged.

When one of these clutches is engaged, the other are disengaged automatically in the following manner:

The hydraulic pump 62 delivers the working fluid from the tank 63 to the cylinders 94 which operate the forward drive clutch 10 and the reverse drive clutch 11 of the reversing gear 2 and to the cylinder 103 which operates the sliding clutch 92. The working fluid passes through the pipelines 111 to the two-position hydraulic control valve 112 which directs the fluid flow either through the pipelines 113 and the three-position hydraulic control valve 114 to one of the spaces 95 of the cylinders 94 or through the pipeline 105 into the space 104 of the hydraulic cylinder 103. When pressure is built up in the space 95 of one of the cylinders 94, one of the blocking clutch member 98 is engaged with the associated driven member 101. When pressure is released from the space 95, of the other cylinder 94 the working fluid flows through the jet 96 to the tank 63 and the other blocking clutch member 98 is moved by the spring 99 out of engagement with the driven member 101.

When pressure is built up in the space 104 of the cylinder 103, the blocking clutch member 107 connected to the piston 106 of the cylinder 103 is engaged with the free clutch member 110, whereby the clutch 92 is brought into engagement. When pressure is released from the space 104, the working fluid flows out through the passage 105. Thereafter the spring 108 forces off the blocking clutch member 107 from the free clutch member 110.

Owing to the interlocking of the device 93 for control of the reversing gear clutches 10 and 11 with the device 102 for control of the sliding clutch 92, the fluid delivered by the pump 62 is fed through the hydraulic control valve 112 either to the hydraulic control valve 114 as shown in FIG. 9 or to the hydraulic cylinder 103. The hydraulic control valve 114 directs the fluid to one of the cylinders 94 which operate the forward drive clutch 10 and the reverse drive clutch 11 of the reversing gear 2.

When the handle 124 is shifted down as shown in FIG. 9, the hydraulic control valve 112 directs the fluid to the hydraulic control valve 114 and thence to the cylinder 94 which operates the clutch 10, whereby the clutch 10 is engaged and the reversing hydromechanical transmission is set to operate in the forward mode.

When the handle 124 is shifted into the neutral position, the slide 121, which is connected to the handle 124 by the rod 123, moves horizontally and, acting through the rod 120, shifts the hydraulic control valve 112 into the left (FIG. 9) position so that it directs the fluid from the pump 62 to the cylinder 103, whereby the sliding clutch 92 is engaged. By the same movement of the handle 124, in virtue of the connection of the other end thereof with the handle 128 which is caused to move vertically, the hydraulic control valve 114 is shifted into the neutral position (downwards in FIG. 9), whereby delivery of fluid to the cylinders 94 is shut off with the result that the forward drive clutch 10 and the reverse drive clutch 11 of the reversing gear 2 become disengaged. In this way the operation in the mode of hydraulic retardation is effected.

When the handle 124 is shifted upward as shown in FIG. 9, the slide 121, which is connected to the handle 124 by the rod 123, acting through the rod 120, shifts the hydraulic control valve 112 into the right (FIG. 9) position so that the fluid from the pump 62 is directed through the pipeline 113 to the hydraulic control valve 114, the fluid contained in the space 104 of the cylinder 103 flowing out through the pipelines 105 and 115 to the tank 63.

The other end of the handle 124 is connected by means of the groove 126 and the pin 127 to the handle 128 and, by virtue of this connection, shifts the hydraulic control valve 114 down as shown in FIG. 9 whereby it directs the working fluid into the cylinder 94 which operates the reverse drive clutch 11.

In this way the transmission is set to operate in reverse.

Now the operation of the reversing hydromechanical transmission embodied according to FIG. 10 will be considered.

In this embodiment, power is transmitted from the reversing gear 2 through the hydrodynamic drive 4b constructed in the form of a fluid coupling and the transmission operates in one of the following modes (the clutch 130 is out of engagement):

Forward movement: Power is transmitted from the shaft 1a of the engine 1 to the input shaft 6 of the reversing gear 2 and thence through the engage forward drive clutch 10 to the shaft 12, thence through the pair of the gears 24 and 26 to the shaft 129, thence through the clutch 130 to the output shaft 27 of the gearbox 3, said shaft 27 rotating in the direction opposite to the rotation of the input shaft 6 of the reversing gear 2. From the shaft 27, via the coupling 28, power is transmitted to the shaft 14 and the impeller 15 of the fluid coupling 4b and thence, through the medium of the fluid circulating in the fluid coupling 4b, to the turbine 17, its shaft 16 and therefrom to the power consumer 5. Under these static conditions the shaft 16 runs in the same direction as the shaft 27, i.e. opposite to the rotation of the input shaft 6 of the reversing gear 2 and, consequently, opposite the rotation of the shaft 1a of the engine 1.

Reverse movement: Power is transmitted from the shaft 1a of the engine 1 to the input shaft 6 of the reversing gear 2, thence through the pair of the gears 7 and 8 to the shaft 9, thence through the engaged reverse drive clutch 11 to the shaft 13, thence through the pair of the gears 25 and 26 to the shaft 129, thence through the clutch 130 to the output shaft 27 of the gearbox 3, said shaft 27 rotating in the same direction as the input shaft 6 of the reversing gear 2. From the shaft 27, via the coupling 28, power is transmitted to the shaft 14 and the impeller 15 of the fluid clutch 4b and thence, through the medium of the working fluid circulating in the fluid coupling 4b, to the turbine 17, its shaft 16 and therefrom to the power consumer 5 (not shown).

Upon completion of reversal, the shaft 16 runs in the same direction as the shaft 1a of the engine 1.

With the clutch 132 engaged and the clutch 130 disengaged, the reversing hydromechanical transmission constructed as shown in FIG. 10 transmits power bypassing the fluid coupling 4b, effecting operation in one of the following modes:

Forward movement: Power is transmitted from the shaft 1a of the engine 1 to the input shaft 6 of the reversing gear 2, thence via the engaged forward drive 10 of the reversing gear 2 to the shaft 12, thence through the gears 24, 26, 25 to the shaft 13, thence through the clutch 132 to the shaft 131 and through the pair of the gears 133 and 91 to the other output shaft 84 which rotates in the direction opposite to the rotation of the shaft 1a of the engine 1. From the shaft 84, via the coupling 85, power is transmitted to the casing 86 of the turbine 17 and therefrom via the shaft 16 to the power consumer 5.

Thus, in this case power is transmitted to the power consumer 5 bypassing the fluid coupling 5b and the gear ratio of the transmission is different from that in the first case of forward movement.

Reverse movement: Power is transmitted from the shaft 1a of the engine 1 to the input shaft 6 of the reversing gear 2, thence through the pair of the gears 7 and 8 to the shaft 9, thence through the engaged reverse drive clutch 11 to the shaft 13, thence through the engaged clutch 132 to the shaft 131 and therefrom, through the pair of the gears 133 and 91, to the outer output shaft 84 which rotates in the same direction as the shaft 1a of the engine 1. From the shaft 84, via the coupling 85, power is transmitted to the casing 86 of the turbine 17 and therefrom, via the shaft 16, to the power consumer 5.

Thus, with the clutch 132 engaged, power from the engine 1 is transmitted to the power consumer 5 bypassing the fluid coupling 4b and the gear ratio of the transmission is different from that obtained by engaging the clutch 130.

The arrangement for interlocking the device 134 (FIG. 11) for control of the clutch 130 designed to transmit power via the fluid coupling 4b with the device 135 for control of the clutch 132 designed to transmit power bypassing the fluid coupling 4b provides for separate engagement of either the clutch 130 or the clutch 132.

When the handle 142 is shifted to the left from the neutral position shown by dotted line in FIG. 11, the two-armed lever 136 connected therewith pivots on the support 141, and the lever arm 137, acting through the articulated connection with the device 134 for control of the clutch 130, engages the movable clutch member 139 with the driven member 143, thereby putting the clutch 130 in work. The other arm 138 of the lever 136, acting through the articulated connection with the device 135 for control of the clutch 132, shifts the movable clutch member 140 still further from the driven clutch member 144, as compared with the neutral position.

When the handle 142 is moved to the right from the neutral position shown in FIG. 11, the two-armed lever 136 connected therewith pivots clockwise on the support 141, and the lever arm 138, acting through the articulated connection with the device 135 for control of the clutch 132, engages the movable clutch member 140 with the driven clutch member 144, thereby putting the clutch 132 in work. The other arm 137 of the lever 136, acting through the articulated joint with the device 134 for control of the clutch 130, shifts the movable clutch member 139 still farther from the driven clutch member 143 than it was in the neutral position.

When the handle 142 is in the neutral position, the two-armed lever 136 is in the centre position. The devices 134 and 135 for control of the clutches 130 and 132 are connected to the lever arms 137 and 138 and retain their respective movable clutch members 139 and 140 away from the driven members 143 and 144, whereby the clutches 130 and 132 are put out of engagement simultaneously.

In the above described embodiment constructed as shown in FIGS. 10 and 11, when the clutch 132 is engaged, the pair of the gears 133 and 91 gives the top gear in the gearbox 3. This top gear is intended for transport travel of the road roller involved from job to job.

Inasmuch as the travel of the road roller during transport need not be particularly smooth, power may be transmitted from the engine 1 to the power consumer 5 bypassing the hydraulic coupling through the medium of an ordinary mechanical kinematic connection, bypassing the hydrodynamic drive 4b. This is conductive to fuel economy since power loss is reduced in this case.

Experimental prototypes of the reversing hydromechanical transmission have been put to numerous tests for a number of years. These tests, which have been carried out on stands, in operation and by the use of endurance testing equipment, have proved high operating properties of the transmission.

The present invention provides:

1. Good smoothness of reversal of the power consumer and the possibility of automatic and manual regulation of the processes of acceleration and retardation.

2. Reduction of energy expanded in the process of reversal, in the reverse mode of operation when power is delivered from the consumer thereof, and in the traction modes of operation.

3. Efficient work as a hydraulic retarder.

4. Limitation of output torques delivered to the power consumer, whereby dynamic loads are reduced and roll slippage is prevented.

5. Reduction of dynamic loads and increase in the life of the transmission.

6. Increase in the rate of working and improvement in the quality of work.

7. Compactness, reliability and low cost of the construction.

Good smoothness of reversal of the power consumer 5 has been proved by numerous experiments, including those carried out by abruptly engaging the clutches 10 and 11 of the reversing gear 2. For example, the duration of engaging the clutches 10 and 11 in some experiments was about 0.1 second, whereas the duration of reversal of power consumer 5 (a road roller in this particular case) was 2 to 4 seconds. The curve for variation of the roller speed was very smooth, with gradual change of the velocity gradient, there being no roll slippage whatsoever.

Fuel saving due to the use of the reversing hydromechanical transmission constituting the present invention was 5 to 12 percent.

Due to reduction of dynamic loads in the roller transmission through the use of the present invention, faultless operation for 7700 hours without tuning and adjusting the reversing gear was achieved. Increase in the rate of work was 12 percent.

The economy effected by the use of the reversing hydrodynamic transmission in road rollers is 7 to 20 percent of the road roller cost in one year of operation.

It is to be understood that changes may be made within the scope of the invention by those skilled in the art, the embodiments of the invention described herein being constructed as broadly as the art permits.

What is claimed is:

1. A reversing hydromechanical transmission intended for use in a road building machine and comprising: a reversing gear with at least two clutches; a device for control of the clutches of said reversing gear; an input shaft incorporated in said reversing gear and designed for connection to the shaft of the engine of said road-building machine; at least one output shaft of said reversing gear; a gearbox; at least one input shaft incorporated in said gearbox and connected to said at least one output shaft of said reversing gear; at least one output shaft of said gearbox; a hydrodynamic drive; a turbine incorporated in said hydrodynamic drive; a shaft of said turbine incorporated in said hydrodynamic drive, which shaft is designed for connection to the power consumer; an impeller incorporated in said hydrodynamic drive; a shaft of said impeller incorporated in the hydrodynamic drive; at least one of said shafts of said hydrodynamic drive being connected to at least one output shaft of said gearbox; said reversing gear, said gearbox and said hydrodynamic drive being designed for transmitting power from the engine to the power consumer.

2. A reversing hydromechanical transmission intended for use in a road building machine and comprising: a reversing gear with at least two clutches; a device for control of the clutches of said reversing gear; and input shaft incorporated in said reversing gear and designed for connection to the shaft of the engine of said road building machine; at least one output shaft of said reversing gear; a gearbox; at least one input shaft incorporated in said gearbox and connected to said at least one output shaft of said reversing gear; a brake coupling of said gearbox; at least one output shaft of said gearbox; a hydrodynamic drive; a turbine incorporated in said hydrodynamic drive; a shaft of said turbine incorporated in said hydrodynamic drive, which shaft is designed for connection to the power consumer; an impeller incorporated in said hydrodynamic drive; a shaft of said impeller incorporated in said hydrodynamic drive; at least one of said shafts of said hydrodynamic drive being connected to at least one output shaft of said gearbox; said braking coupling incorporated in the gearbox and located in parallel with said shaft of said impeller and said shaft of said turbine; said at least one output shaft of the gearbox being connected to said shaft of said impeller incorporated in said hydromechanical drive and kinematically connected to said brake coupling; a device for control of said brake coupling, said device for control of said brake coupling being interlocked with said drive for control of said reversing gear clutches in such a manner that when said brake coupling is engaged, the reversing gear clutches are disengaged, due to which the reversing hydromechanical transmission works as a hydraulic retarder; said reversing gear, said gearbox and said hydrodynamic drive being designed for transmitting power from the engine to the consumer.

3. A reversing hydromechanical transmission intended for use in a road building machine and comprising: a reversing gear with at least two clutches; a device for control of the clutches of said reversing gear; an input shaft incorporated in said reversing gear and designed for connection to the shaft of the engine of said road building machine; at least one output shaft of said reversing gear; a gearbox; at least one input shaft incorporated in said gearbox and connected to said at least one output shaft of said reversing gear; at least one output shaft of said gearbox; a hydrodynamic drive; a turbine incorporated in said hydrodynamic drive; a shaft of said turbine incorporated in said hydrodynamic drive, which shaft is designed for connection to the power consumer; an impeller incorporated in said hydrodynamic drive; a shaft of said impeller incorporated in said hydrodynamic drive; at least one of said shafts of said hydrodynamic drive being connected to at least one output shaft of said gearbox; said at least one output shaft of said gearbox being rigidly connected to said shaft of said impeller incorporated in said hydrodynamic drive, whereby torque limitation in lower gears is effected; said reversing gear, said gearbox and said hydrodynamic drive being designed for transmitting power from the engine to the power consumer.

4. A reversing hydromechanical transmission intended for use in a road building machine and comprising: a reversing gear with at least two clutches; a device for control of the clutches of said reversing gear; an input shaft incorporated in said reversing gear and designed for connection to the shaft of the engine of said road building machine; at least one output shaft of said reversing gear; a gearbox; at least one output shaft incorporated in said gearbox and connected to said at least one output shaft of said reversing gear; at least one output shaft of said gearbox; a hydrodynamic drive; a turbine incorporated in said hydrodynamic drive; a shaft of said turbine incorporated in said hydrodynamic drive, which shaft is designed for connection to the power consumer; an impeller incorporated in said hydrodynamic drive; a shaft of said impeller incorporated in said hydrodynamic drive; at least one of said shafts of said hydrodynamic drive being connected to at least one output shaft of said gearbox; said at least one output shaft of said gearbox being rigidly connected to said shaft of said impeller incorporated in said hydrodynamic drive; a device for regulating the power of said hydrodynamic drive; a control of said device for regulating the power of said hydrodynamic drive; a limiter of the travel of said control; a gearbox gearshift lever interlocked with said limiter of the travel of said control, said limiter being movably mounted in such a manner that shifting the gearbox into lower gears increases the travel of said control with resultant increase in the power of the hydrodynamic drive, whereas shifting the gearbox into higher gears decreases the travel of said control with resultant decrease in the power of said hydrodynamic drive; said reversing gear, said gearbox and said hydrodynamic drive being designed for transmitting power from the engine to the power consumer.

5. A reversing hydromechanical transmission intended for use in a road building machine and comprising: a reversing gear with at least two clutches; a device for control of the clutches of said reversing gear; an input shaft incorporated in said reversing gear and designed for connection to the shaft of the engine of said road building machine; at least one output shaft of said reversing gear; a gearbox; at least one output shaft incorporated in said gearbox and connected to said at least one output shaft of said reversing gear; at least one output shaft of said gearbox; another output shaft of said gearbox; a hydrodynamic drive; a turbine incorporated in said hydrodynamic drive; a shaft of said turbine incorporated in said hydrodynamic drive, which shaft is designed for connection to the power consumer; an impeller incorporated in said hydrodynamic drive; a shaft of said impeller incorporated in said hydrodynamic drive; at least one of said shafts of said hydrodynamic drive being connected to at least one output shaft of said gearbox; said at least one output shaft of said gearbox being rigidly connected to said shaft of said impeller incorporated in said hydrodynamic drive; said other output shaft of the gearbox being rigidly connected to said shaft of said turbine; said other output shaft of the gearbox being kinematically connected to said at least one output shaft of said gearbox, the kinematic connection of said other output shaft of said gearbox with said at least one output shaft thereof being effected through a gearing having an odd number of gears and through a sliding clutch with a device for control thereof; said device for control of said sliding clutch being interlocked with said device for control of said reversing gear clutches in such a manner that during the process of braking the power consumer the sliding clutch is engaged with the reversing gear clutches disengaged, due to which the braking of the power consumer is effected by said impeller and turbine rotating in opposite directions, no engine energy being expended for the purpose; said reversing gear, said gearbox and said hydrodynamic drive being designed for transmitting power from the engine to the power consumer.

6. A reversing hydromechanical transmission intended for use in a road building machine and comprising: a reversing gear with at least two clutches; a device for control of the clutches of said reversing gear; an input shaft incorporated in said reversing gear and designed for connection to the engine of said road building machine; at least one output shaft of said reversing gear; a gearbox; at least one input shaft incorporated in said gearbox and connected to said at least one output shaft of said reversing gear; at least one output shaft of said gearbox; another output shaft of said gearbox; a hydrodynamic drive; a turbine incorporated in said hydrodynamic drive; a shaft of said turbine incorporated in said hydrodynamic drive, which shaft is designed for connection to the power consumer; an impeller incorporated in said hydrodynamic drive; a shaft of said impeller incorporated in said hydrodynamic drive; at least one of said shafts of said hydrodynamic drive being connected to at least one output shaft of the gearbox; said at least one output shaft of said gearbox being rigidly connected to said shaft of said impeller incorporated in said hydrodynamic drive; said at least one output shaft of said gearbox being kinematically connected to said at least one input shaft thereof, the kinematic connection between said at least one output shaft of said gearbox and said at least one input shaft thereof being effected by means of one engaging clutch with a device for control thereof; said other output shaft of said gearbox being kinematically connected to said at least one input shaft of said gearbox; kinematic connection of said other output shaft of the gearbox with said at least one input shaft thereof by means of the other engaging clutch with a device for control thereof; said other output shaft of said gearbox being rigidly connected to said shaft of said turbine; the device for control of one engaging clutch being interlocked with the device for control of said other engaging clutch in such a manner that throwing in said one engaging clutch throws out said other engaging clutch, whereby transmission of power from the engine to the power consumer, with said other engaging clutch thrown in, is effected without the use of said hydrodynamic drive; said reversing gear, said gearbox and said hydrodynamic drive being designed for transmitting power from the engine to the power consumer.

* * * * *